United States Patent [19]

Murphree

[11] Patent Number: 4,959,817
[45] Date of Patent: Sep. 25, 1990

[54] INTRUDER TARGET MONITORING SONAR ALARM SYSTEM

[75] Inventor: Francis J. Murphree, Maitland, Fla.

[73] Assignee: The United States of America as represented by the Secretary of the Navy, Washington, D.C.

[21] Appl. No.: 853,069

[22] Filed: Aug. 26, 1969

[51] Int. Cl.⁵ ............................................. G01S 15/00
[52] U.S. Cl. ........................................ 367/97; 367/93; 367/87
[58] Field of Search ................ 340/1 C, 3; 343/5 DP, 343/5 PD, 7 RS; 367/97, 93, 87

[56] References Cited

U.S. PATENT DOCUMENTS 3,380,018  4/1968  Littrell et al. ............................. 340/3

Primary Examiner—Thomas H. Tarcza
Assistant Examiner—Daniel T. Pihulic
Attorney, Agent, or Firm—Robert W. Adams

[57] ABSTRACT

A system for detecting the presence of intruder targets in an area under sonar surveillance and in which the number of normal targets may vary, including the processing of gated time sample receiver signals through a first monitoring circuit having a counter and comparator means to develop output signals representing deviation of actual time sample count from a normal reference count, and through a second monitoring circuit including additional counter and count trigger means for developing an alarm signal responsive to continued deviation of actual count from reference count over several actual counts in a time sequence of counts such that normal variation of target number will not produce an alarm signal.

10 Claims, 5 Drawing Sheets

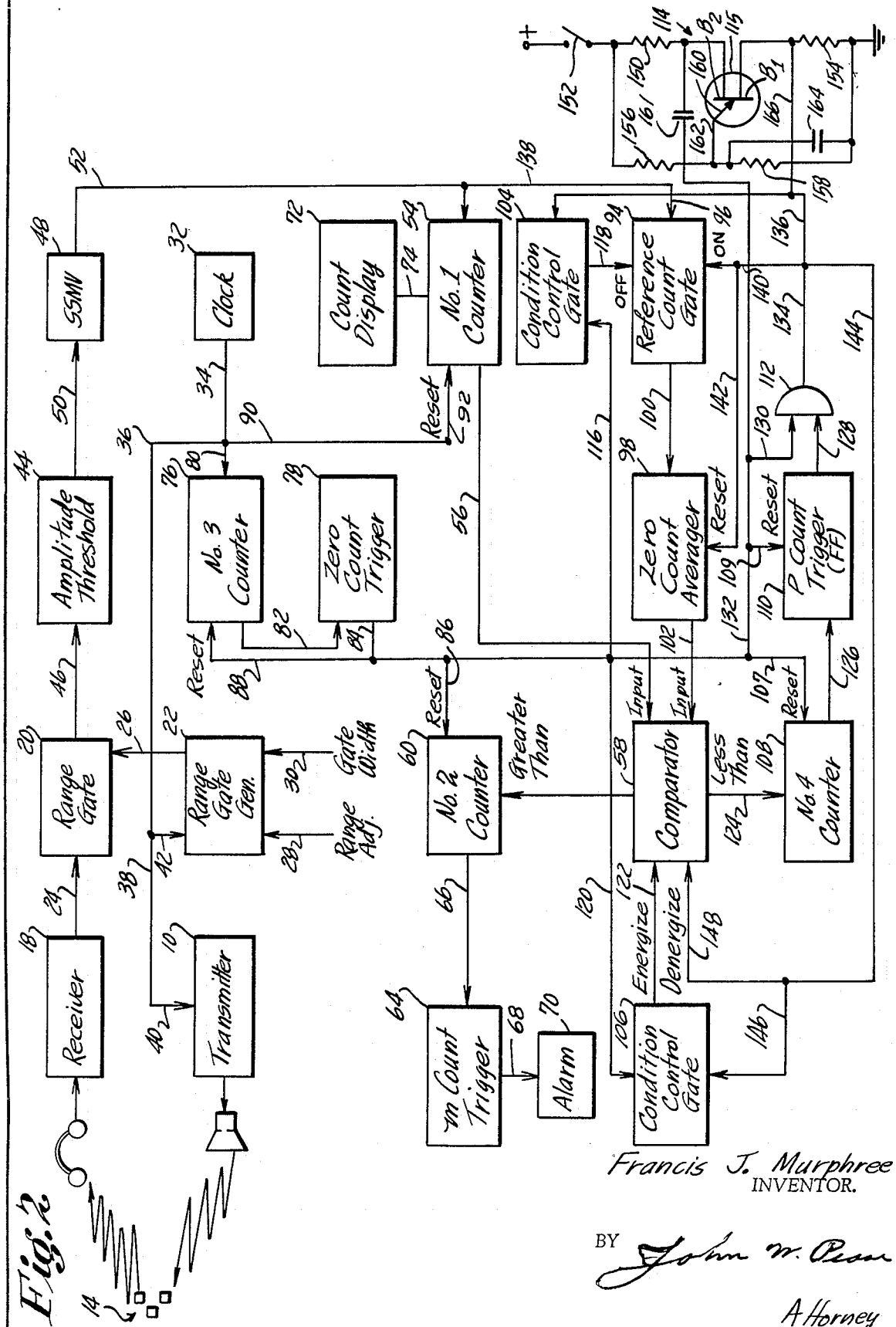

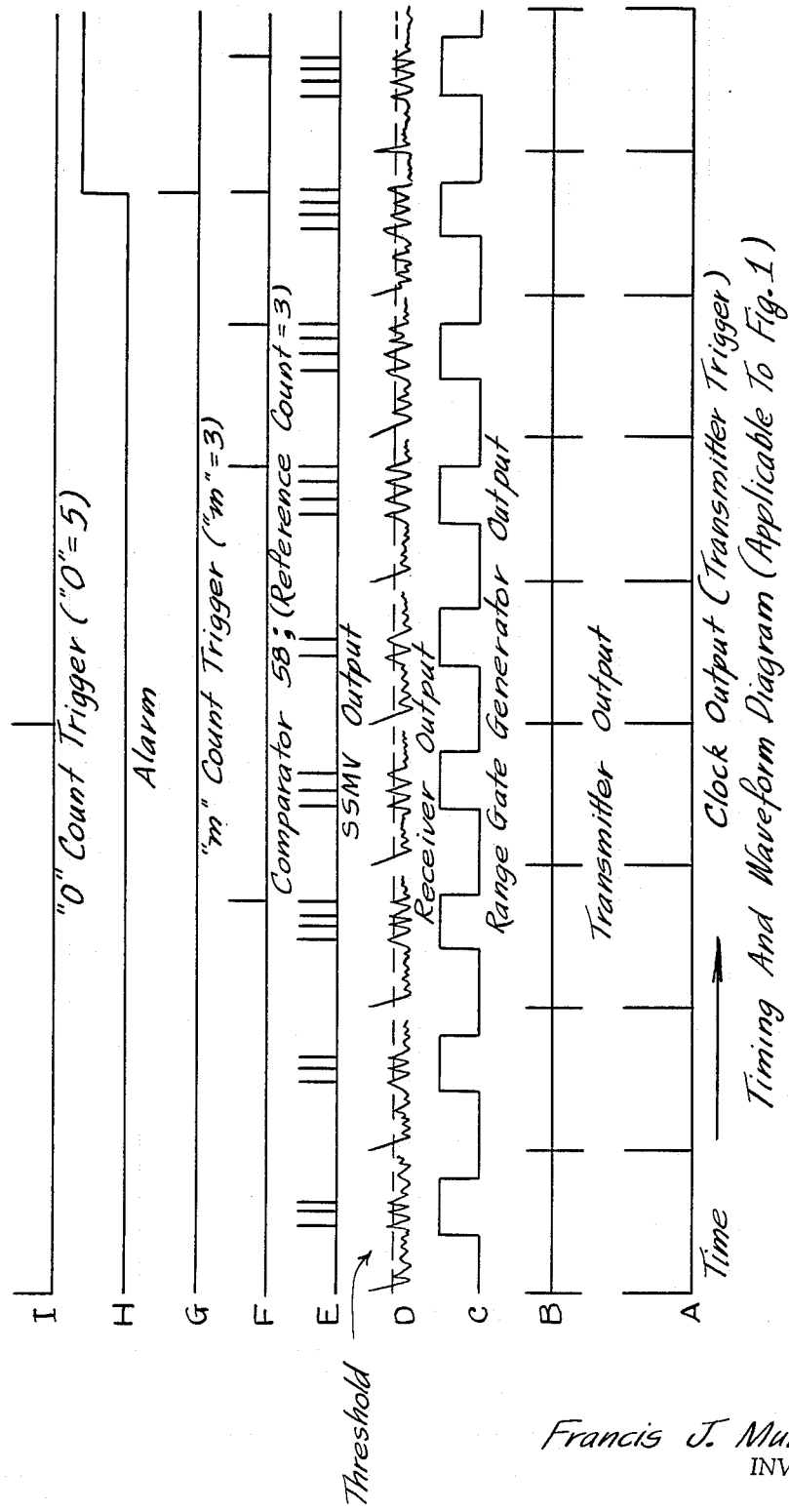

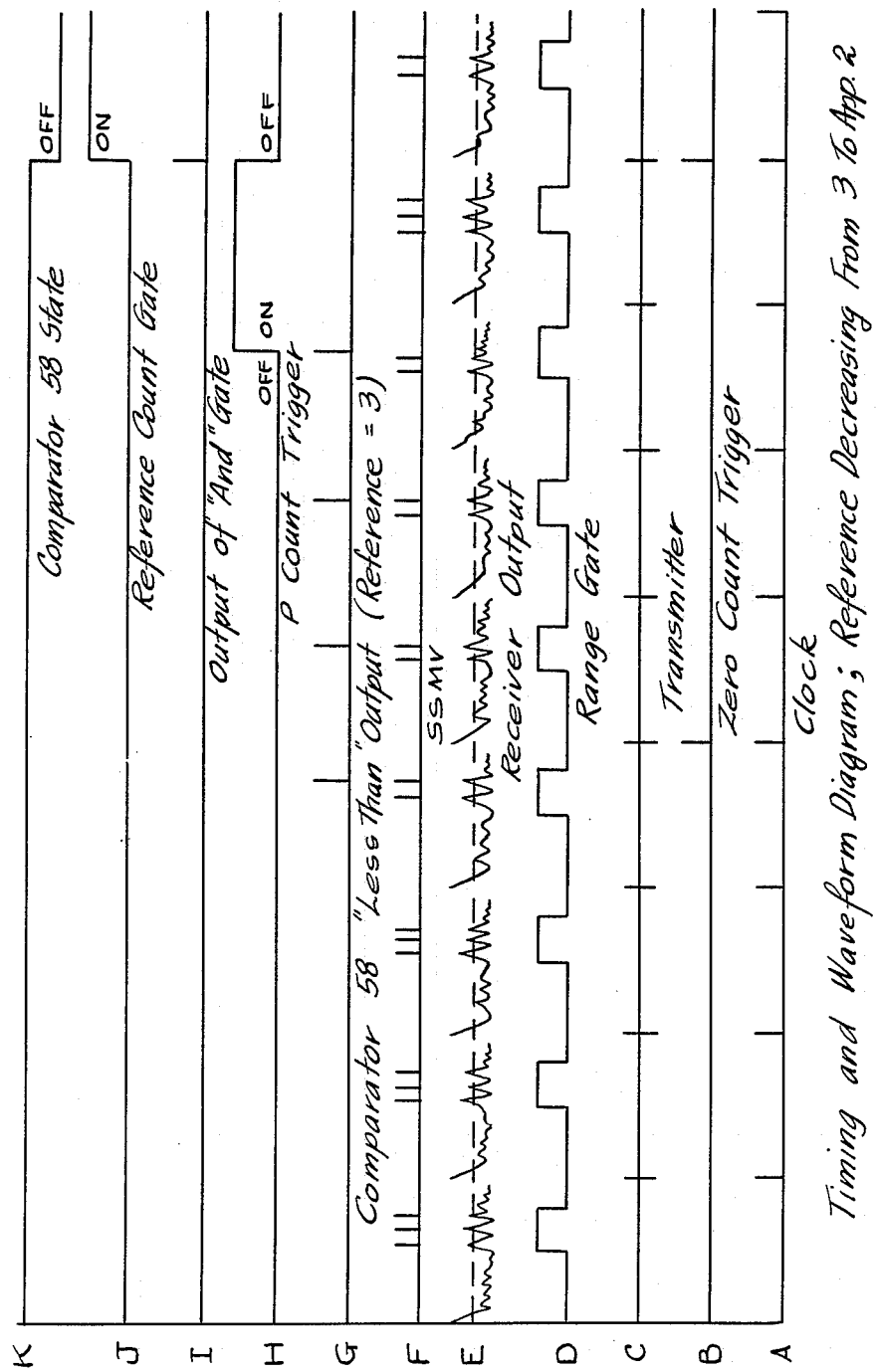

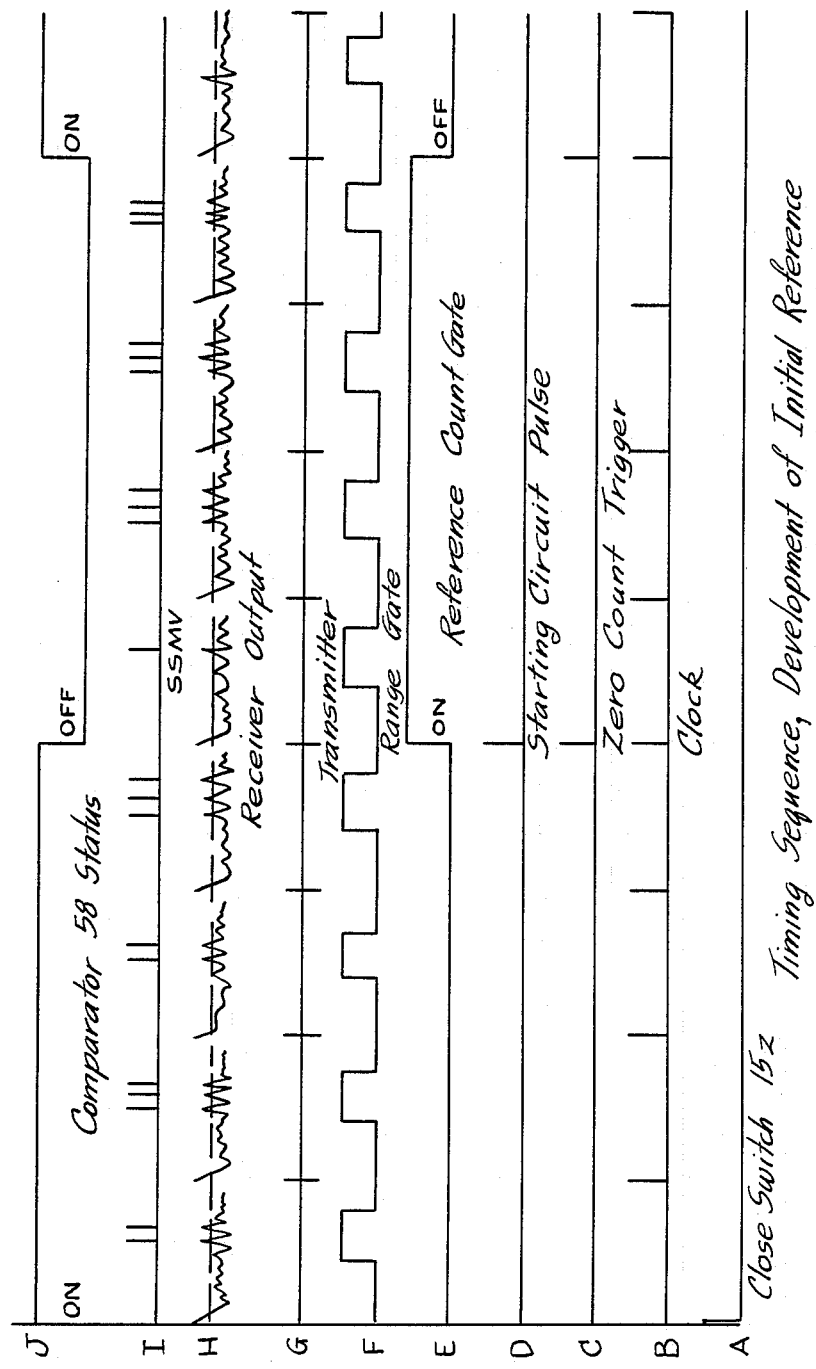

4,959,817

INTRUDER TARGET MONITORING SONAR ALARM SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

As viewed by a hydrophone, the signal from normal targets is not constant in amplitude or number of echo signals received. A measure of relief from this situation may be obtained by the use of amplitude threshold devices to exclude relatively weak signals not characteristic of expected intruder targets. However, this approach also tends to reduce the effective range of target surveillance in that at greater distance intruder targets also may produce weak signals and thus be lost to detection by the system.

Other means previously employed to provide reliable maximum range detection include systems based upon the doppler principle to differentiate between moving and stationary targets. The doppler effect means is limited in its overall performance by the fact that at some target radial velocity its doppler shift in frequency is not sufficient to allow it to be separated from the echo return from stationary targets.

SUMMARY OF THE INVENTION

The subject invention and the operation of the device to be described herein is based on the fact that for a given monitored area the number of fixed echoes apt to be seen may vary from one time sample to the next. Yet for a given number of looks at the target the average normal target number is fairly constant such that the presence or absence of an intruder target is more closely allied with an average count than with factors available from a specific count. With the above in mind, the subject invention comprises the provision of a plurality of monitoring circuits wherein in one monitoring circuit a normal target reference count is established in a count comparator and a sequence of actual counts are each compared to the reference count to develop an output of error counts representative of deviations from actual counts. Since such error counts can be expected in a monitored area where normal count may also vary, the invention further provides a second monitoring circuit including a counter and an "m" count trigger responsive to said error signals to develop an alarm signal when error signals are repeated fairly consistently over a sequence of several looks at the target area, the consistency of repetition of error necessary to effect an alarm signal being dependent upon the factor "m" selected. In accordance with a further aspect of the invention, means in the form of a counter, count averager and associated gate circuits, is provided to actuate the development of a reference count in the comparator responsive to a previous next immediate sequence of actual counts of said monitored area.

DESCRIPTION OF THE DRAWINGS

In the drawings:

FIG. 2 is a block diagram of another embodiment of the invention including automatic means for establishing a reference count;

FIGS. 3 and 4 are diagrams of wave forms useful in explaining the operation of the system of FIGS. 1 and 2 respectively; and FIG. 5 is a diagram of wave forms useful in explaining the operation of the starting circuit portion of FIG. 2.

DESCRIPTION OF THE PREFERRED EMBODIMENT

Figure 1:
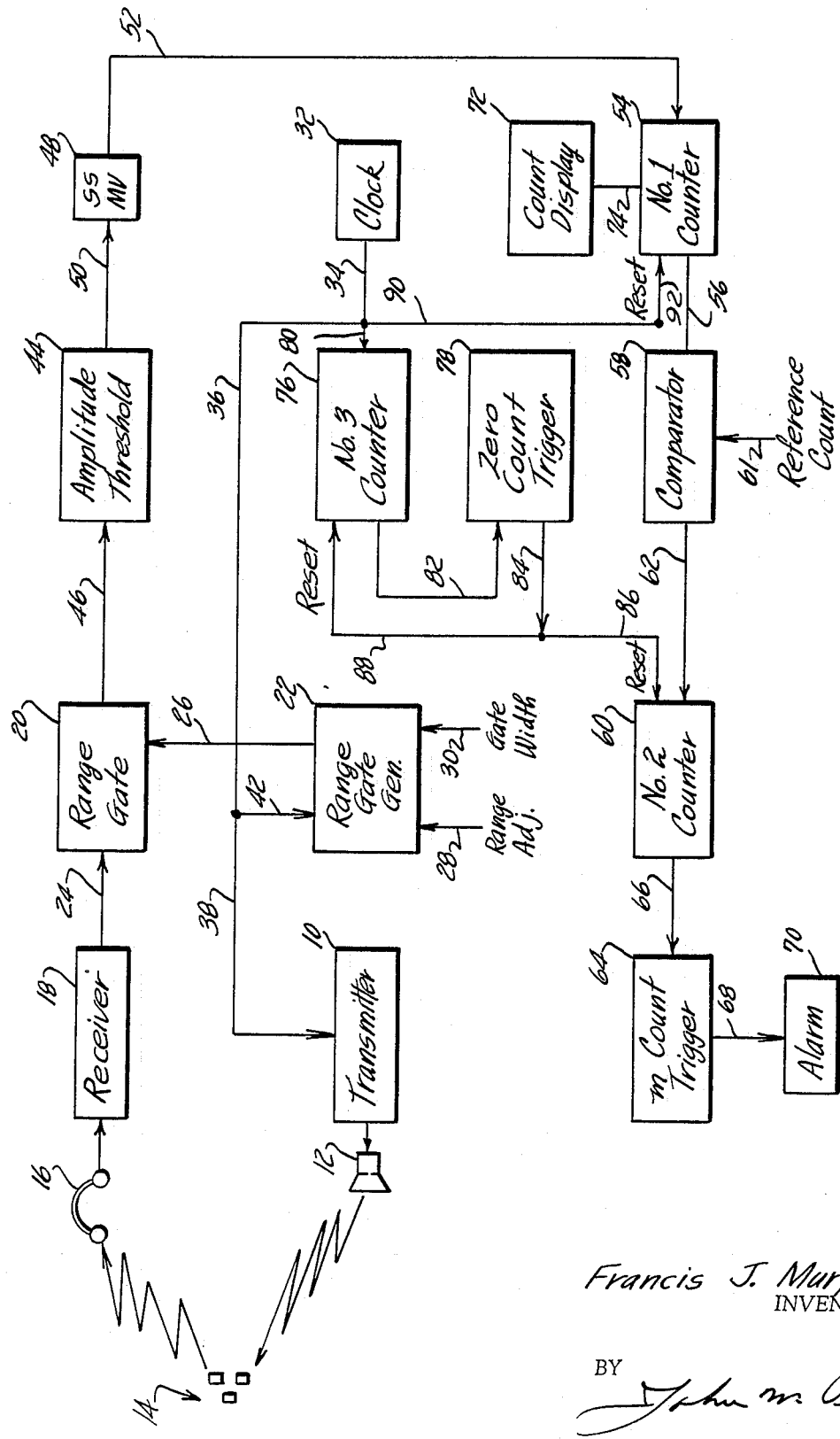
FIG. 1 is a block diagram of an intruder target detection system incorporating the subject invention.

Referring to FIG. 1, there is shown a sonar system including a sound transmitter 10 and projector 12 positioned to monitor a target area 14 where the number of normal targets therein may vary, and hydrophones 16 and receiver 18 to receive signals from the targets of the monitored area 14.

A receiver range gate 20 and range gate generator 22 are connected to the receiver 18 via lines 27 and 26 to time sample the output of the receiver 18 to produce gated output signals representative of an actual count of targets in the monitored area 14 in the time period of the gate 20. The range and width of the range gate 20 is provided by adjustment of the range gate generator as indicated by the arrows 28 and 30.

A timer indicated by the clock 32 is connected via lines 34, 36, 38, and 40 to the transmitter 10 to provide a desired ping signal repetition rate. Clock 32 is connected by lines 34, 36, and 42 to the range gate generator 22 which generates a gate pulse of adjustable duration and of adjustable time of occurrence, so that any desired range interval within the total rang interval can be examined.

An amplitude threshold gate 44 is connected by line 46 to receive gated signals from range gate 20 and to pass to a single shot multivibrator 48 via line 50, signals which exceed an amplitude threshold to thereby trigger miltivibrator 48. The output of multivibrator 48 is passed via line 52 to a first counter 54 connected by line 56 to a comparator 58. Counter 54 and comparator 58 comprise a first monitor circuit for comparing an actual target count established by counter 1 to a reference count for which the comparator is set by suitable means indicated by the arrow 61 and which in this case may be a manual adjustor forming part of the comparator circuit.

The reference count is set such that the comparator 58 will provide an output signal each time an actual count exceeds a known normal count of said targets. In considering the above it is to be noted that in a given target environment and within a given range gate the number of echoes exceeding the threshold established by gate 44 can vary from none to several. Assume that two fixed echoes are present that exceed the threshold 44 nine out of ten times in a normal target number condition. The comparator 58 then would be adjusted so that it will trigger and produce an error signal output each time three echoes are received during a range gate. This error signal output however is not a reliable signal for operating an alarm because although a new target would normally cause an output signal to be produced from comparator 58 such signal could also be caused by random effects such as noise spikes. If, however, an error output from comparator 58 were developed, say six out of ten cycles, then one could assume such signal to be caused by a new target.

With the above in mind and in accordance with the invention, I provide a second monitor circuit including a second counter 60 connected by line 62 to receive the error output signals of comparator 58 and an "m" count adjustable trigger 64 connected by line 66 to the second counter 60. Trigger 64 is programmed to pass an output alarm signal on line 68 to alarm 70 only when said error output signal count exceeds a predetermined "m" count allowable for normal target number variation to thereby avoid developing false alarm signals due to the normal variation in number of normal targets.

Counter 54 may be provided with a count display 72 connected to the counter 54 by line 74 to read out a series of actual counts to establish a desired reference count for comparator 58.

A third counter 76 and zero count trigger 78 are provided to reset counter 60 after an adjustable number of transmissions determined by the setting of the zero count trigger 78 so that random counts accumulated in the second counter 60 do not cause false alarm signals. Thus, counter 76 is connected by lines 34 and 80 to the timer 32 to receive a pulse each time transmitter 10 is pulsed to operate. The output of counter 76 is passed on line 82 to the zero count trigger, the setting of which determines the number of transmissions to be made before an output thereof is passed on lines 84 and 86 to counter 60 to reset the latter. At the same time the output of trigger 78 is passed on lines 84 and 88 to reset counter 76 as indicated. Counter 54, connected to timer 32 by lines 34, 90, and 92, is reset to zero at each transmission of the timer 32.

The operation of the sonar system of FIG. 1 is, as described above, a manually operated circuit to the extent that the comparator 58 is manually set to a reference count indicative of normal target count in a given time sample period. Each actual count taken by the counter 54 is passed to the comparator 58 for comparison with the reference count stored therein. The comparator provides an error signal on line 62 each time the normal count exceeds the reference count in comparator. Each error signal is indicative of either an intruder target or a normal variation in target number. To be sure that the error signals are indicative of an intruder target and not an occasional normal variation in target number, the error signals are passed on line 66 to the "m" count trigger which will produce an alarm signal if the excess count continues for "m" counts out of the count established in the zero count trigger 78. Thus, for example, if the zero count trigger 78 is set at 10 and the "m" count trigger is set at 6, and if under those conditions an alarm signal is obtained on line 68, then this means that in six out of ten looks at the target there is indication of an intruder target and the presence of such target should be investigated. It is understood that the "m" count setting can be developed for a given area in accordance with experience as to the frequency of normal target number variation for that particular area.

FIG. 2 shows a further embodiment of the invention in which instead of providing for manual reset on the comparator 58, means are provided for automatically adjusting the comparator to a normal reference count.

In FIG. 2 the same numbering is retained for that part of the circuit which is identical to that shown in FIG. 1, and description of the common elements is not repeated.

The automatic adjusting means shown in FIG. 2 includes a reference count gate 94 connected by lines 96 and 52 to the multivibrator 48 to receive gated count signals from the range gate 20, and a count averager 98 connected by line 100 to receive gated count signals from the reference count gate 94 when said reference count gate is in "on" condition and to pass an average of said counts to said comparator 58 by line 102 as a reference count, together with an activating circuit for programming the operation of the comparator 58 and reference count gate 94. The activating circuit includes first and second condition control gates identified as 104 and 106 serving as condition control gate means controlling the on-off condition of the reference count gate 94 and comparator 58, and a counter circuit means including a fourth counter 108, a P count trigger 110 and an AND gate 112 for actuating the refrrence count gate 94 and count averager 98 responsive to a read out from the comparator indicating a current actual count which is less than a previously stored reference count. A suitable starting circuit, as for example, the single pulse generator circuit identified generally at 114, is provided for starting the automatic circuit to initially place a reference count in the comparator 58.

Referring to FIG. 2 in further detail, the first condition control gate 104 is connected by lines 116, 88 and 84 to be activated by the zero count trigger 78 to pass an output signal on line 118 to the reference count gate 94 to hold the latter in "off" condition. The second condition control gate 106 is connected by lines 120, 88, and 84 to the zero count trigger 78 and by line 122 to the comparator 58 to hold the latter in energized condition responsive to a signal from the zero count trigger. "Off" condition of the reference count gate 94 and energized or "on" condition of the comparator are the conditions for target monitoring operations of the overall system with a view to producing an alarm in the event of an intruder target. When the system operates to automatically store a reference count in the comparator 58 the conditions of reference count gate 94 and comparator 58 will be reversed as will be described hereinafter.

Considering now the counter circuit means and the AND gate for actuating the zero count averager to develop a reference count in comparator 58, the counter 108 is connected to comparator 58 by line 124 to receive an error signal from comparator 58 each time an actual count of targets is less than the reference count stored in comparator 58. The P count trigger 110 is connected by line 126 to the counter 108 and by line 128 to the AND gate 112 to provide a correction signal to the AND gate 112 when the number of error signals received by trigger 110 reaches the number P. AND gate 112 is also connected by lines 130, 132, 88, and 84 to receive an input from the zero count trigger 78. The output of AND gate 112 is connected by lines 134, 136, and 138 to condition control gate 104 to deactivate the latter, by lines 134 and 140 to reference count gate 94 to condition said gate to "on" condition, and by lines 134, 140, and 142 to the zero count averager 98 to reset the latter to zero count. The circuit is thus conditioned for the passage of several actual target counts from line 52 through reference gate 94 to the zero count averager 98 which passes an average of the counts to the comparator 58 as a reference count frequency. During this time the comparator is maintained in de-energized condition by connecting the output of AND gate 112 on lines 134, 144, and 146 to interrupt the operation of the second condition control gate 106 while the same output is passed on lines 134, 144, and 148 to the comparator 58 to de-energize the latter. Counter 108 is reset to zero count from zero count trigger 78 via lines 84, 88, and 107. P count trigger 110 is reset to zero count from zero count trigger 78 via lines 84, 88, 132, and 109.

To initially establish a reference count in the comparator 58, any suitable single pulse generator is provided to supply the actuating signal in place of the output signal of AND gate 112. As one suitable circuit, indicated at 114, the input side $B_2$ of a unijunction transistor 115 is connected through a resistor 150 and switch 152 to a positive polarity source indicated and the output $B_1$ of the unijunction is connected to ground indicated through resistor 154. Resistors 156 and 158 are connected in series between the positive potential and ground to provide a midpoint for connection to the emitter 160 of unijunction transistor 115 by a line 162 to forward bias the unijunction transistor. The circuit is actuated by a negative pulse from the zero count trigger 78 passing through lines 84, 88, 132 and a capacitor 161 to the input side, $B_2$, of the transistor. A capacitor 164 connected across resistor 158 to ground upon discharge through the emitter 160 provides a positive pulse of voltage on a line 166 connecting circuit 114 to lines 138 and 136 and thence as indicated to the condition control gates 104 and 106 and the comparator 58, zero count averager 98 and reference count gate 94 to condition the system for developing an initial reference count in comparator 58. Once the initial reference count is established in the comparator 58 corrections to the reference count become automatically responsive to the output of the AND gate 112.

Capacitor 164 also functions to insure that the unijunction transistor does not fire when the power supply voltage is first applied. That is, the $B_2$ voltage has time to assume its full value before the emitter voltage reaches its full value. The circuit constants are such that once the unijunction transistor fires, it remains in "on" condition until switch 152 is opened. If the system develops an alarm signal responsive to an intruder target the system thereafter is reset by opening and closing switch 152.

FIGS. 3, 4, and 5 are provided to indicate the timing and wave forms developed in operation of the circuits of FIGS. 1 and 2 and the starter circuit 114.

Thus, referring to FIG. 3, line A indicates the time signal output of the clock 32 as applied to the range gate generator 22 and transmitter 10. Line B represents the ping output signal of the transmitter 10 and line C indicates the range gate generator output determining the range and time period of target signal to be sampled. Line D indicates the receive signals obtained from the receiver 18 and the threshold cutoff value provided by the amplitude threshold gate 44. Line E indicates the actual count output for each ping-receive cycle and for the data of line D indicates that the actual counts vary from 2 to 4. Line F indicates the output of comparator 58 when set at a reference count of 3. Assuming the zero count trigger to be set at 5 as indicated by line I and the "m" count trigger to be set at 3, line G indicates no alarm signal in the first series of looks at the target area because only one error pulse is indicated on line F during this period. However, after the reset signal from the zero count trigger at the count 5, there is indicated on line F three error signals out of the next four target counts. Hence, as shown on line G, an alarm signal is generated at this point in time and as shown on line H the alarm is actuated.

Referring to FIG. 2, the operation of the automatic circuit shown therein following the same operation as described in detail for the FIG. 1 circuit while the FIG. 2 circuit is conditioned for monitoring a target area and developing an alarm signal responsive to an intruder target. Briefly stated, the target signals received are time sampled by range gate 20. Weak signals are excluded by threshold gate 44. The gated actual count is passed through counter 54 to comparator 58. Comparator 58 provides an output error signal to counter 60 when the actual count is greater than the reference count, and the "m" count trigger 64 actuates the alarm 70 when error signals are repeated "m" times between zero count triggers.

Should the actual count be less than the reference count and should the "less than" count be repeated P times, then the remainder of the circuit of FIG. 2 is placed in operation to condition the circuit for a new reference count by opening reference count gate 94 and de-energizing comparator 58.

The operation of conditioning the reference count gate 94 and comparator 58 for the establishment of a new reference count is shown in the timing and wave form diagram of FIG. 4.

In FIG. 4, line A indicates the time clock 32 pulses, line C the ping signals of he transmitter 10, and line D the time sample periods established by the range gate generator 22 and range gate 20. Line E indicates the receiver output in time relation to the time sample gates and also indicates the effect of the amplitude threshold gate 44. Line F indicates the actual count gated signals supplied to the counter 54 and thence to the comparator 58. Line G indicates the result of comparing the actual count gated signals to the reference count where the reference count is 3. Line B indicates the zero count trigger pulses. It will be noted that in the circumstances described there is an output of one error count in the first zero count trigger sequence and a count of three "less than" outputs in the next zero count sequence. P count trigger being set at 3, no further action occurs on the single "less than" output signal. However, in the second sequence the 3 "less than" output signals triggers P count trigger 110 to provide an output correction signal to the AND gate 112 on line 128. This is indicated on line H of FIG. 4. Thereafter, when zero count trigger 78 provides a pulse to AND gate 112 on line 130, the AND gate 112 then provides an output on line 134 to condition the reference count gate 94 to "on" condition as indicated by line J of FIG. 4 and to condition the comparator to "off" condition as indicated by line K of FIG. 4.

The circuit of FIG. 2 is then in condition to pass the next zero count trigger sequence of actual count gated signals through reference count gate 94 to zero count averager 98 which establishes a new reference count in comparator 58. Responsive to the next reset signal from zero count trigger 78 the condition of the reference count gate is returned to "off" status and the comparator is switched to "on", i.e., energized condition, and target area monitoring is continued with the new reference count.

Initially when there is no reference signal in the comparator 58, the circuit is started by closing switch 152 to develop a pulse to actuate the reference count gate 94 to "on" condition and the comparator to de-energized condition.

Thus, as shown in FIG. 5, line A indicates closing of the switch 152. Line B indicates the timing clock pulses for actuating the range gate generator 22 and the transmitter 10. Line C indicates the zero count trigger outputs. Line D indicates the voltage pulse output from starting circuit 114 obtained responsive to the receipt of a negative pulse by circuit 114 from the zero count trigger 78. Line E indicates the conditioning of reference count gate 94 to "on" condition responsive to the output of starting circuit 114, and line J indicates conditioning of the comparator 58 to de-energized condition by the same starter circuit pulse. Thereafter as shown on line G the transmitter 10 is pulsed. A receiver output signal as shown on line H is acted upon by the range gate 20 for time sampling, and is further acted upon by the amplitude threshold gate 44 as shown by the dotted line on line H and the resulting actual count gated signal as indicated on line I is passed through the reference count gate 94 and through the zero count averager 98 to provide an initial reference count in comparator 58.

It should be apparent from the foregoing description that the subject invention provides the advantage of improved reliability of alarm signal and the avoidance of false alarms. It is to be noted also that while the use of an amplitude threshold gate is useful in the subject invention to reduce the number of targets monitored to an optimum number compatible with the system and target areas, yet it is not needed as a means for preventing false alarms and hence the target range can be extended beyond that for which conventional sonar system would be applicable.

What is claimed is:

1. In a sonar system including a sound transmitter and receiver for monitoring an area where the number of normal targets therein may vary and for producing an alarm signal responsive to the presence of an intruder target in said area, the improvement comprising:
   a. a timer connected to said transmitter and adjustable to provide a desired ping signal repetition rate;
   b. a receiver range gate and range gate generator connected to said timer, transmitter and receiver to time sample the output of said receiver to produce gated output signals representative of an actual count of targets in said monitored area in the time period of said gate;
   c. a first monitor circuit including a first counter connected to receive said gated output signals and a comparator connected to said counter;
   d. said comparator being adjustable to provide in said comparator a reference count representative of normal target count to provide an error output signal when said actual target count received from said first counter exceeds said reference count in said time sample period;
   e. a second monitor circuit including a second counter connected to receive said error output signals and an "m" count adjustable trigger programmed to pass an output alarm signal only when said error output signal count exceeds a predetermined "m" count allowable for normal target number variation to thereby avoid developing false alarm signals due to said normal target number variation.

2. Apparatus according to claim 1 including
   a. a threshold gate connected to said range gate and to said first counter to selectively adjust the strength of target signals to be processed through said apparatus and eliminate undesirable weak background signals.

3. Apparatus according to claim 1 including
   a. a third counter and zero count trigger;
   b. said third counter being connected to said timer and through said zero count trigger to said second counter to reset said second counter after an adjustable number of sound transmissions determined by the setting of said timer so that random counts accumulated in said second counter do not cause false alarm signals.

4. Apparatus according to claim 2, including
   a. a third counter and zero count trigger;
   b. said third counter being connected to said timer and through said zero count trigger to said second counter to reset said second counter after an adjustable number of sound transmissions so that random counts accumulated in said second counter do not cause false alarm signals.

5. Apparatus according to claim 3, including means for automatically adjusting said comparator to a normal reference count comprising
   a. a normally closed reference count gate connected to receive actual count gated signals from said range gate;
   b. a count averager connected to receive said gated count signals from said reference count gate when said reference count gate is in on condition and to pass an average of said counts to said comparator as a reference count;
   c. condition control gate means connected to said zero count trigger and to said reference count gate and said comparator to normally hold said reference count gate in off condition and said comparator in energized condition to provide an error signal to said second counter when the actual count in said comparator is greater than the reference count therein;
   d. starting circuit means connected to said condition control gate means and to said reference count gate and comparator to condition said reference count gate to on condition and said comparator to deenergize condition to initially establish a reference count in said comparator;
   e. an AND gate connected to said zero count trigger to receive a first input signal;
   f. counter circuit means connected to receive output signals from said comparator indicative of actual counts less than said reference count and to provide an error output signal as a second input to said AND gate; and
   g. means connecting said AND gate to said control gate means and to said reference gate and comparator to operate responsive to said first and second input signals to inactivate the holding effect of said condition control gate means and activate said count averager while deenergizing said comparator to provide a new reference count in said comparator.

6. Apparatus according to claim 5,
   a. said condition control gate means including a first condition control gate connected to said zero count trigger and to said reference count gate to maintain said reference count gate in off condition responsive to the output signal of said zero count trigger and a second control gate connected to said zero count trigger and to said comparator to maintain said comparator in energized condition responsive to the output of said zero count trigger;
   b. said counter circuit means including a counter connected to said comparator to receive error signals when the actual count passed to said comparator is less than the reference count stored therein, and a P count trigger connected to said counter to provide an output signal when said error signal is repeated P times.

7. Apparatus according to claim 6,
   a. said starting circuit comprising a single pulse generator responsive to said zero count trigger and connected to said first and second condition control gates and to said comparator to initially condition said reference count gate to on condition and said comparator to de-energize condition to establish an initial reference count in said comparator.

8. Apparatus according to claim 4, including
   a. a normally closed reference count gate connected to receive actual count gated signals from said range gate;
   b. a count averager connected to receive said gated count signals from said reference count gate when said gate is in on condition and to pass an average of said counts to said comparator as a reference count;
   c. condition control gate means connected to said zero count trigger and to said reference count gate and said comparator to normally hold said reference count gate in off condition and said comparator in energized condition to provide an error signal to said second counter when the actual count in said comparator is greater than the reference count therein;
   d. starting circuit means connected to said condition control gate means and to said reference count gate and comparator to condition said reference count gage to on condition and said comparator to deenergize condition to initially establish a reference count in said comparator;
   e. an AND gate connected to said zero count trigger to receive a first input signal;
   f. counter circuit means connected to receive output signals from said comparator indicative of actual counts less than said reference count and to provide an error output signal as a second input to said AND gate; and
   g. means connecting said AND gate to said control gate means and to said reference gate and comparator to operate responsive to said first and second input signals to inactivate the holding effect of said condition control gate means and activate said count averager while deenergizing said comparator to provide a new reference count in said comparator.

9. Apparatus according to claim 8,
   a. said condition control gate means including a first condition control gate connected to said zero count trigger and to said reference count gate to maintain said reference count gate in off condition and responsive to the output signal of said zero count trigger and a second control gate connected to said zero count trigger and to said comparator to maintain said comparatotr in energized condition responsive to the output of said zero count trigger;
   b. said counter circuit means including a counter connected to said comparator to receive error signals when the actual count passed to said comparator is less than the reference count stored therein, and a P count trigger connected to said counter to provide an output signal when said error signal is repeated P times.

10. Apparatus according to claim 9,
    a. said starting circuit comprising a single pulse generator responsive to the output signal of said zero count trigger and connected to said first and second condition control gates and to said reference count gate and comparator to initially condition said reference count gate to on condition and said comparator to de-energized condition to establish an initial reference count in said comparator.

* * * * *